(12) United States Patent
Aguila et al.

(10) Patent No.: US 10,348,566 B2
(45) Date of Patent: Jul. 9, 2019

(54) AUTOMATED SERVICE DELIVERY BASED ON AUTOMATED IDENTIFIER DISCOVERY

(71) Applicants: Ariel Aguila, Sterling, VA (US); Brian D. Saunders, Lenexa, KS (US)

(72) Inventors: Ariel Aguila, Sterling, VA (US); Brian D. Saunders, Lenexa, KS (US)

(73) Assignee: Nokia of America Corporation, Murray Hill, NJ (US)

( * ) Notice: Subject to any disclaimer, the term of this patent is extended or adjusted under 35 U.S.C. 154(b) by 240 days.

(21) Appl. No.: 15/385,592

(22) Filed: Dec. 20, 2016

(65) Prior Publication Data

US 2018/0176085 A1 Jun. 21, 2018

(51) Int. Cl.
| | |
|---|---|
| *G06F 15/177* | (2006.01) |
| *H04L 12/24* | (2006.01) |
| *H04L 12/751* | (2013.01) |
| *H04L 29/08* | (2006.01) |
| *H04L 12/46* | (2006.01) |
| *H04L 29/12* | (2006.01) |

(52) U.S. Cl.
CPC ........ *H04L 41/0886* (2013.01); *H04L 12/462* (2013.01); *H04L 41/0816* (2013.01); *H04L 45/02* (2013.01); *H04L 69/324* (2013.01); *H04L 61/2015* (2013.01)

(58) Field of Classification Search
CPC ... H04L 41/0886; H04L 12/462; H04L 45/02; H04L 69/324; H04L 61/2015
USPC ........................................................ 709/222
See application file for complete search history.

(56) References Cited

U.S. PATENT DOCUMENTS

| | | | |
|---|---|---|---|
| 9,049,114 B2 | 6/2015 | Frey | |
| 2007/0097972 A1* | 5/2007 | Jain | .................... H04L 12/4641 370/392 |
| 2008/0049777 A1* | 2/2008 | Morrill | ............... H04L 41/0896 370/420 |
| 2012/0294192 A1 | 11/2012 | Masood et al. | |
| 2014/0313933 A1* | 10/2014 | Chen | .................. H04L 12/6418 370/254 |
| 2015/0280992 A1 | 10/2015 | Wang et al. | |

* cited by examiner

*Primary Examiner* — Wing F Chan
*Assistant Examiner* — Joseph R Maniwang
(74) *Attorney, Agent, or Firm* — Tong, Rea, Bentley & Kim, LLC

(57) ABSTRACT

The present disclosure generally discloses an automated service delivery capability for use in automating service delivery in a communication system. The automated service delivery capability may be configured to support, in a communication system in which communication between routers at sites of a first entity (e.g., communication service provider) is supported using a layer-2 circuit provided by a communication network of a second entity (e.g., communication network provider), automated discovery of the layer-2 circuit identifier of the layer-2 circuit by the first entity even though the layer-2 circuit is provided by the second entity and the first entity has limited or no visibility into the communication network of the second entity. The automated discovery of the layer-2 circuit identifier of the layer-2 circuit by the first entity enables the first entity to support automated service delivery using communication between the sites of the first entity based on the layer-2 circuit provided by the second entity.

20 Claims, 5 Drawing Sheets

AUTOMATED SERVICE DELIVERY BASED ON AUTOMATED IDENTIFIER DISCOVERY

TECHNICAL FIELD

The present disclosure relates generally to communication systems and, more particularly but not exclusively, to automated service delivery in communication systems.

BACKGROUND

Communication service providers offer various types of communication services to customers. For example, communication service providers such as cellular service providers may provide cellular networks, which may include cellular access networks and cellular core networks, by which customers may obtain cellular wireless access and access the Internet. Many communication service providers do not build out full, end-to-end networks, but, rather, may run services over third-party networks (e.g., for connecting cell sites to central offices or the like). Disadvantageously, however, the use of such third-party networks for this purpose may complicate various service provisioning and management functions that may be performed by the communication service provider in order to support the services for the customers.

SUMMARY

The present disclosure generally discloses an automated service delivery capability based on automated identifier discovery.

In at least some embodiments, an apparatus includes a processor and a memory communicatively connected to the processor. The processor is configured to scan, by a network access device of a first entity, at least a portion of a set of potential layer-2 identifiers supported by a communication network of a second entity to identify thereby an assigned layer-2 identifier assigned by the second entity for a layer-2 circuit provided for the network access device by the communication network of the second entity. The processor is configured to initiate, by the network access device based on identification of the assigned layer-2 identifier assigned by the second entity for the layer-2 circuit provided for the network access device by the communication network of the second entity, a management action. In at least some embodiment, a non-transitory computer-readable storage medium is provided where the non-transitory computer-readable storage medium stores instructions which, when executed by a computer, cause the computer to perform a corresponding method. In at least some embodiments, a corresponding method is provided.

In at least some embodiments, an apparatus includes a processor and a memory communicatively connected to the processor. The processor is configured to apply, by a network access device of a first entity, an initial configuration for the network access device. The processor is configured to discover, by the network access device based on the initial configuration for the network access device, an assigned layer-2 identifier of a layer-2 circuit provided for the network access device by a communication network of a second entity. The processor is configured to establish, based on the assigned layer-2 identifier of the layer-2 circuit, a layer-3 connection between the network access device and a second device of the first entity. The processor is configured to receive, by the network access device from a management system of the first entity via the layer-3 connection between the network access device and the second device, a device configuration for the network access device. The processor is configured to apply, by the network access device, the device configuration for the network access device. In at least some embodiment, a non-transitory computer-readable storage medium is provided non-transitory computer-readable storage medium stores instructions which, when executed by a computer, cause the computer to perform a corresponding method. In at least some embodiments, a corresponding method is provided.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses an automated service delivery capability for use in automating service delivery in a communication system. The automated service delivery capability may be configured to support automated service delivery in a communication system in which communication between routers at sites of a first entity (e.g., a communication service provider) is supported using a layer-2 circuit that is provided by a communication network of a second entity (e.g., a communication network provider). The automated service delivery capability may be configured to support, in such a communication system in which communication between routers at sites of a first entity is supported using a layer-2 circuit provided by a communication network of a second entity, automated discovery of the layer-2 circuit identifier of the layer-2 circuit by the first entity (e.g., by either or both of the routers utilizing the layer-2 circuit) even though the layer-2 circuit is provided by the second entity (and, thus, the layer-2 identifier is assigned by the second entity) and the first entity has limited or no visibility into the communication network of the second entity. The automated discovery of the layer-2 circuit identifier of the layer-2 circuit by the first entity enables the first entity to support automated service delivery using communication between the sites of the first entity. In at least some embodiments, in which the sites of the first entity include an access site having an access router and a core site having a core router and the communication between the access router and the core router is via a layer-2 circuit of the second entity, the access router may be configured to support functions providing automated discovery of the layer-2 circuit identifier of the layer-2 circuit provisioned by the second entity for use by the first entity. The automated service delivery capability may provide various improvements in computer performance in supporting automated service delivery in communication networks, which may include improvements in computer performance for various types of functions (e.g., identifier discovery, device configuration, service provisioning, or the like, as well as various combinations thereof) which may be provided by various types of devices (e.g., routers, servers, management systems, or the like, as well as various combinations thereof). It will be appreciated that these and various other embodiments and advantages or potential advantages of the automated service delivery capability may be further understood by way of reference to the example communication system of FIG. 1.

Figure 1:
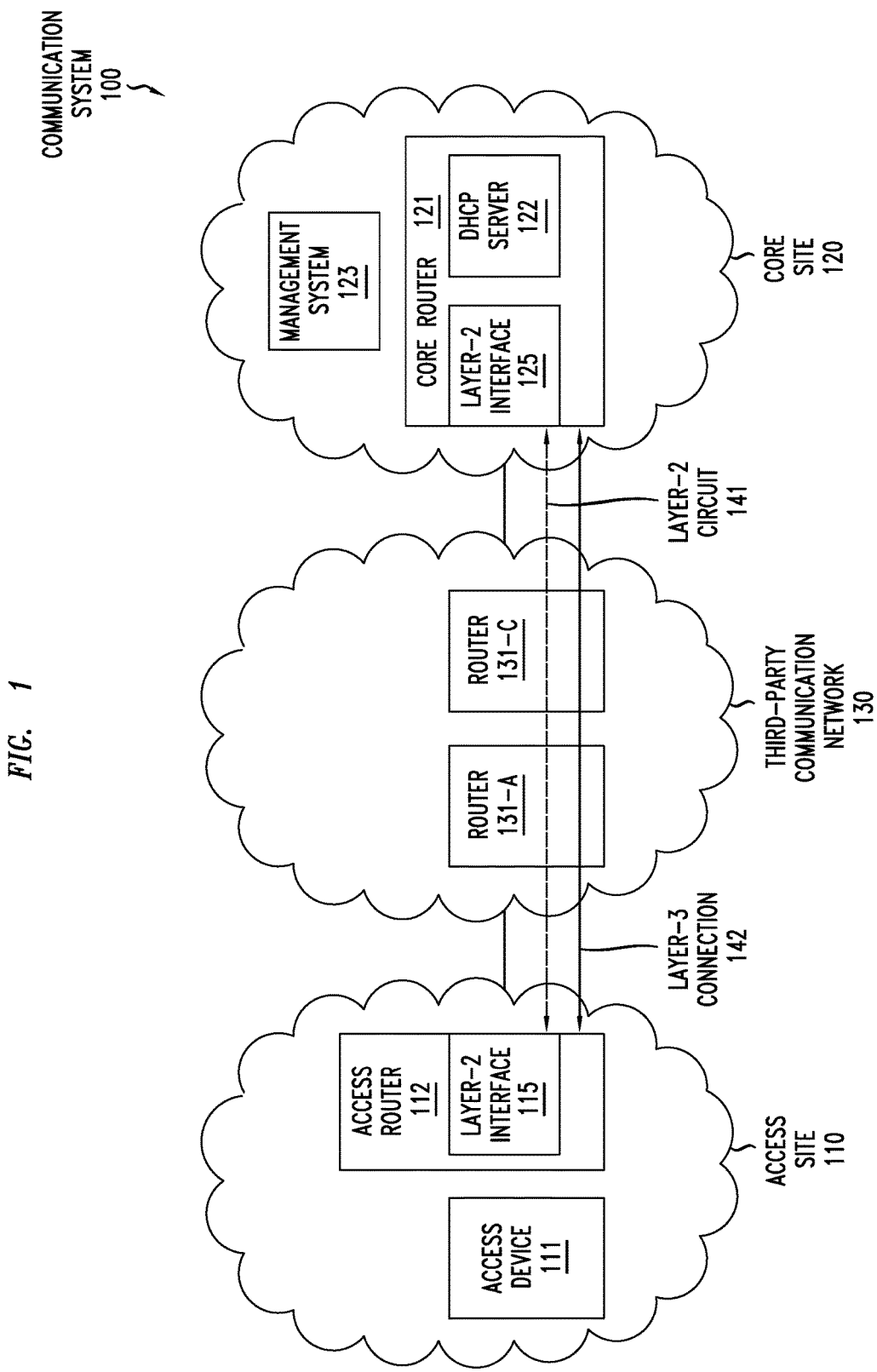
FIG. 1 depicts a communication system that is configured to support a communication service of a communication service provider using a third-party communication network of a communication network provider.

FIG. 1 depicts a communication system that is configured to support a communication service of a communication service provider using a third-party communication network of a communication network provider.

The communication system 100 includes an access site 110, a core site 120, and a third-party communication network 130.

The access site 110 and the core site 120 are operated by the communication service provider, whereas the third-party communication network 130 is operated by the communication network provider. The communication service provider and the communication network provider are separate entities. The access site 110 and core site 120 may be controlled and managed by the communication service provider, whereas the third-party communication network 130 may be controlled and managed by the communication network provider. As a result, the communication service provider may have limited or no visibility into third-party communication network 130 of the communication network provider and, similarly, the communication network provider may have limited or no visibility into the access site 110 and the core site 120 of the communication service provider.

The access site 110 is a location at which network equipment is deployed for enabling a customer or customers of the communication service provider to access communication services provided by the communication service provider. The access site 110 includes an access device 111 and an access router 112. The access device 111 may be any access device configured to enable a customer or customers of the communication service provider to access communication services provided by the communication service provider. For example, where the communication service provider is a Third Generation (3G) Universal Mobile for Telecommunications (UMTS) cellular provider, the access device 111 may be a NodeB. For example, where the communication service provider is a Fourth Generation (4G) Long Term Evolution (LTE) cellular provider, the access device 111 may be an evolved NodeB (eNodeB). For example, where the communication service provider is a Fifth Generation (5G) cellular provider, the access device 111 may be a remote radio head (RRH). The access device 111 may be any other suitable type of device which may communicate via access router 112. The access router 112 is configured to operate as a gateway from the access site 110 to the third-party communication network 130. The access router 112 may be configured to provide various functions of the automated service delivery capability. It will be appreciated that the access site 110 may include various other devices configured to support communication services of the communication service provider.

The core site 120 is a location at which network equipment is deployed for enabling a customer or customers of the communication service provider to use the communication services provided by the communication service provider (e.g., to access a private data network, to access a public data network such as the Internet, or the like, as well as various combinations thereof). The core site 120 includes a core router 121 and a management system (MS) 123. The core router 121 may be service router configured to enable a customer or customers of the communication service provider to use the communication services provided by the communication service provider. The core router 121 is configured to operate as a gateway between the core site 120 and the third-party communication network 130. The core router 121 may be configured to provide various functions of the automated service delivery capability. For example, the core router 121 may be an edge router configured to support various services (e.g., virtual private network (VPN) services, Internet access services, cloud services, data center services, or the like, as well as various combinations thereof), a mobile aggregation router for one or more types of wireless access (e.g., for one or more of 3G, 4G LTE, 5G, or the like), or the like, as well as various combinations thereof. The core router 121 may be configured to include Dynamic Host Configuration Protocol (DHCP) server functionality (illustratively, DHCP server 122) to provide DHCP functions for access router 112 (although it will be appreciated that the DHCP server functionality may be provided by a different device, such as a different device that incorporates the DHCP server functionality, a separate DHCP server, or the like). The MS 123 is configured to provide various management functions for the communication service provider, which may include configuration of devices (e.g., the access router 112, the core router 121, or the like), establishment of connections between devices (e.g., between the access router 112 and the core router 121 via the third-party communication network 130), or the like, as well as various combinations thereof. For example, MS 123 may be an element management system (EMS), a network management system (NMS), or the like, as well as various combinations thereof. The MS 123 may be configured to provide various functions of the automated service delivery capability. It will be appreciated that the core site 120 may include various other devices configured to support communication services of the communication service provider.

The third-party communication network 130 is a network of the communication network provider. The third-party communication network 130 is configured to support a layer-2 circuit 141 provided by the communication network provider for the communication service provider. The layer-2 circuit 141 provided by the communication network provider is configured to support a layer-3 connection 142 of the network service provider that is configured to support communications between the access site 110 and the core site 120 (and, more specifically, between the access router 112 of the access site 110 and the core router 121 of the core site 120). Here, layer-2 and layer-3 may refer to Layer 2 (also referred to as the Data Link Layer) and Layer 3 (also referred to as the Network Layer) of the Open Systems Interconnection (OSI) model, respectively (and it will be appreciated that other layer numbers may be used in other computer networking protocol models, such as the Internet Protocol Suite or others). The third-party communication network 130 may include various network elements configured to support communications via the third-party communication network 130. As depicted in FIG. 1, for example, the third-party communication network 130 may include a router 131-A configured to interface with the access router 112 of access site 110 (the router 131-A may be configured as a gateway for the access router 112 of access site 110) and a router 131-C configured to interface with the core router 121 of core site 120 (the router 131-C may be configured as a gateway for the core router 121 of core site 120). The third-party communication network 130, given that it supports layer-2 circuits such as the layer-2 circuit 141, may support various layer-2 and layer-2-related technologies, such as Ethernet, Multiprotocol Label Switching (MPLS), Internet Protocol (IP), or the like, as well as various combinations thereof. For example, the third-party communication network 130 may be an Ethernet-based network (e.g., a Metro Ethernet Network where the communication network provider is a Metro Ethernet Provider, a Wide-Area Ethernet Network where the communication network provider is a Wide-Area Ethernet Provider, or the like), an MPLS-over-Ethernet network, an IP/MPLS-over-Ethernet network, or the like, as well as various combinations thereof. It will be appreciated that the third-party communication network 130 may include various other elements (e.g., routers, switches, management systems, or the like, as well as various combinations thereof).

As indicated above, the access site 110 and core site 120 of the communication service provider are configured to support communications therebetween using the layer-3 connection 142 which relies on the layer-2 circuit 141. The layer-2 circuit 141 may be provided between the access router 112 of the access site 110 and the core router 121 of the core site 120. The layer-2 circuit 141 may be provided between a layer-2 interface 115 of the access router 112 and a layer-2 interface 125 of the core router 121. The layer-2 circuit 141 has a layer-2 identifier assigned thereto by the communication network provider (which, as discussed herein, needs to be discovered by the communication service provider in order for the communication service provider to use the layer-2 circuit 141 for communication between the access router 112 of the access site 110 and the core router 121 of the core site 120). The layer-2 circuit 141 may be a virtual layer-2 circuit. The layer-2 virtual circuit may be an Ethernet virtual circuit having a Virtual Local Area Network (VLAN) Identifier (ID) assigned thereto (i.e., the layer-2 identifier is the VLAN ID that is assigned to the layer-2 circuit 141). The layer-2 interface 115 and the layer-2 interface 125 may be virtual interfaces (e.g., Ethernet virtual interfaces or the like). The layer-3 connection 142 may be an Internet Protocol (IP) connection (e.g., based on an IP address assigned to the access router 112 for the layer-3 connection and an IP address assigned to the core router 121 for the layer-3 connection) or other suitable type of layer-3 connection.

As indicated above, the access site 110 and core site 120 of the communication service provider are configured to support communications therebetween in order to support communications of the communication service provider (e.g., configuration of elements such as access router 112 and core router 121, transport of data between access router 112 and core router 121, or the like, as well as various combinations thereof). The access router 112 of the access site 110 and the core router 121 of the core site 120 may be configured to communicate via the layer-3 connection 142 established by the communication service provider between the access router 112 and the core router 121. The layer-3 connection 142 of the communication service provider is supported by the layer-2 circuit 141 provided by the communication network provider within the third-party communication network 130 of the communication network provider. The establishment and use of the layer-3 connection 142 by the communication service provider, as indicated above, relies upon the layer-2 circuit 141 that is provided by the communication network provider in third-party communication network 130.

As indicated above, the access site 110 and core site 120 may be controlled and managed by the communication service provider, whereas the third-party communication network 130 may be controlled and managed by the communication network provider. The communication network provider, in order to establish the layer-2 circuit 141 and, further, enable the layer-2 circuit 141 for use by the layer-3 connection 142 between the access router 112 and the core router 121, needs to be able to identify the layer-2 circuit 141 (e.g., using a layer-2 circuit identifier of the layer-2 circuit 141, such as the VLAN ID of the layer-2 circuit 141). Similarly, the communication service provider, in order to establish the layer-3 connection 142 between the access router 112 and the core router 121, needs the layer-2 circuit 141 to be supported by third-party communication network 130 and, additionally, needs at least some information identifying the layer-2 circuit 141 (e.g., the layer-2 circuit identifier of the layer-2 circuit 141, such as the VLAN ID of the layer-2 circuit 141). In other words, in order for the layer-3 connection 142 of the communication service provider to use the layer-2 circuit 141 provided by the communication network provider, both the communication service provider and the communication network provider need to agree on the layer-2 circuit identifier of the layer-2 circuit 141 (again, e.g., the VLAN ID of the layer-2 circuit 141).

The access router 112 of the access site 110 and the DHCP server 122 of the core server 121 of the core site 120 may be configured to support functions providing automated discovery of the layer-2 circuit identifier of the layer-2 circuit 141 provisioned by the communication network provider for the communication service provider. The automated discovery of the layer-2 circuit identifier of the layer-2 circuit 141 provisioned by the communication network provider for the communication service provider may facilitate automation of the configuration of the access router 112 of the access site 110 by the MS 123 of the core site 120. It will be appreciated that the automated discovery the layer-2 circuit identifier of the layer-2 circuit provisioned by the communication network provider for the communication service provider may obviate the need for manual discovery of the layer-2 circuit identifier of the layer-2 circuit 141 provisioned by the communication network provider for the communication service provider and, thus, may obviate the need for a manual provisioning process for provisioning the access router 112 of the access site 110.

The access router 112 of the access site 110 and the DHCP server 122 of the core server 121 of the core site 120 may be configured to support functions providing automated discovery of the layer-2 circuit identifier of the layer-2 circuit 141 provisioned by the communication network provider for the communication service provider. Here, for purposes of clarity in describing automated discovery of the layer-2 circuit identifier of the layer-2 circuit 141, it is assumed that the layer-2 circuit identifier is a VLAN ID.

The access router 112 may automatically discover the VLAN ID of the layer-2 circuit 141 provisioned by the communication network provider for the communication service provider by sweeping, or scanning, a set of potential VLAN IDs until identifying one of the potential VLAN IDs that is the assigned VLAN ID that has been assigned by the communication network provider for the layer-2 circuit 141.

The access router 112 may scan the potential VLAN IDs in any suitable order (e.g., by beginning with a VLAN ID of 0 and incrementing the VLAN ID by one for each successive scan operation, by beginning with a VLAN ID of 4095 and decrementing the VLAN ID by one for each successive scan operation, by randomly selecting VLAN IDs from the set of potential VLAN IDs, or the like).

The access router 112, after selecting one of the potential VLAN IDs for evaluation, may determine whether the selected one of the potential VLAN IDs is the assigned VLAN ID assigned by the communication network provider for the layer-2 circuit 141 by configuring the layer-2 interface 115 for the layer-2 circuit 141 to use the selected one of the potential VLAN IDs and determining whether configuration of the layer-2 interface for the layer-2 circuit 141 to use the selected one of the potential VLAN IDs will enable establishment of the layer-3 connection 142 between the access router 112 and the core router 121 or has resulted in establishment of the layer-3 connection 142 between the access router 112 and the core router 121.

In at least some embodiments, after selecting one of the potential VLAN IDs for evaluation, the access router 112 may determine whether the selected one of the potential VLAN IDs is the assigned VLAN ID based on monitoring of a protocol. The access router 112 may monitor a protocol by listening for a protocol advertisement of the protocol. For example, the access router 112 may monitor the DHCP protocol by monitoring, or listening, for a DHCP advertisement from a DHCP server (e.g., DHCP server 122 of core router 121). The access router 112, based on a determination that the protocol for which the access router 112 is listening has been detected (e.g., a protocol advertisement of the monitored protocol is received), determines that the selected one of the potential VLAN IDs is the assigned VLAN ID for the layer-2 circuit 141. The access router 112, based on such a determination that the selected one of the potential VLAN IDs is the assigned VLAN ID for the layer-2 circuit 141, may then use the protocol to request a layer-3 address (e.g., an IP address) for use in establishing the layer-3 connection 142 between the access router 112 and the core router 121. The access router 112, based on a determination that the protocol for which the access router 112 is listening has not been detected (e.g., a protocol advertisement of the monitored protocol is not received or is not received within a threshold length of time), determines that the selected one of the potential VLAN IDs is not the assigned VLAN ID for the layer-2 circuit 141. The access router 112, based on such a determination that the selected one of the potential VLAN IDs is not the assigned VLAN ID for the layer-2 circuit 141, may then continue scanning the potential VLAN IDs by selecting and evaluating a next potential VLAN ID (assuming that all potential VLAN IDs have not yet been evaluated).

In at least some embodiments, after selecting one of the potential VLAN IDs for evaluation, the access router 112 may determine whether the selected one of the potential VLAN IDs is the assigned VLAN ID based on an attempt to obtain a layer-3 address (e.g., IP address) for use in establishing the layer-3 connection 142 between the access router 112 and the core router 121. The access router 112 may propagate a request for a layer-3 address toward a server using a protocol and determine whether or not a response including a layer-3 address is received. For example, the request and response for the layer-3 address may be based on DHCP via interaction by the access router 112 with a DHCP server (e.g., DHCP server 122 of core router 121). The access router 112, based on a determination that a response including a layer-3 address is received, determines that the selected one of the potential VLAN IDs is the assigned VLAN ID for the layer-2 circuit 141. The access router 112, based on a determination that a response including a layer-3 address is not received, determines that the selected one of the potential VLAN IDs is not the assigned VLAN ID for the layer-2 circuit 141. The access router 112, based on such a determination that the selected one of the potential VLAN IDs is not the assigned VLAN ID for the layer-2 circuit 141, may then continue scanning the potential VLAN IDs by selecting and evaluating a next potential VLAN ID (assuming that all potential VLAN IDs have not yet been evaluated).

The access router 112, after identifying the assigned VLAN ID that has been assigned by the communication network provider for the layer-2 circuit 141, may initiate or perform one or more additional actions for configuring itself to operate as a full router that is capable of supporting communications of devices associated with access site 110 (e.g., access device 111). The access router 112, after identifying the assigned VLAN ID assigned by the communication network provider for the layer-2 circuit 141 and obtaining the layer-3 address for the layer-3 connection 142 to be used by the access router 112, may configure itself to use the layer-3 address. The access router 112, after identifying the assigned VLAN ID assigned by the communication network provider for the layer-2 circuit 141 and obtaining the layer-3 address for the layer-3 connection 142 to be used by the access router 112, may initiate establishment of the layer-3 connection 142 between the access router 112 and the core router 121. The access router 112, after identifying the assigned VLAN ID that has been assigned by the communication network provider for the layer-2 circuit 141, may initiate or perform one or more additional actions for configuring itself to operate as full router that is capable of supporting communications of devices associated with access site 110 (at least some of which are discussed further below in conjunction with a description of an overall process by which the access router 112 is configured to operate as a full router that is capable of supporting communications of devices associated with access site 110).

The communication service provider, based on automation of the discovery of the layer-2 circuit identifier of the layer-2 circuit 141 provisioned by the communication network provider for the communication service provider, may be able to automate configuration of the access router 112 to operate as a full router that is capable of supporting communications of devices associated with access site 110 (e.g., the access device 111). The access router 112, responsive to being activated, may apply an initial router configuration. The initial router configuration may be supplied on the access router 112 (e.g., during manufacturing or at least prior to initial activation of the access router 112). The initial router configuration may be sufficient to enable the access router 112 to automatically discover, for the layer-2 interface 115 of the access router 112, the layer-2 circuit identifier of the layer-2 circuit 141 provisioned by the communication network provider for the layer-2 interface 115 of the access router 112. The initial router configuration may include a default IP address for use by access router 112 for communication via the layer-2 interface 115 of the access router 112. The access router 112 may then proceed with automated discovery of the layer-2 circuit identifier of the layer-2 circuit 141 for the layer-2 interface 115 of the access router 112. The access router 112, during or following automated discovery of the layer-2 circuit identifier of the layer-2 circuit 141 for the layer-2 interface 115 of the access router 112, receives, from the DHCP server (e.g., DHCP server 122 of core router 121), an IP address assigned by the DHCP server for use by the access router 112 for communication via the layer-3 connection 142 to be established between the access router 112 and the core router 121 (with the layer-2 circuit 141 supporting the layer-3 connection 142). It is noted that this IP address may or may not be changed during full configuration of the access router 112 as discussed further below. The access router 112, based on the IP address assigned by the DHCP server, establishes the layer-3 connection 142 with the core router 121 such that the access router 112 is connected to the core router 121 and, thus, has reachability to other elements of core site 120 (including the MS 123). The MS 123 may then configure the access router 112 to use a full router configuration. In at least some embodiments, the full configuration of the access router 112 may be initiated by the access router 112 (e.g., the access router 112, responsive to establishment of the layer-3 connection 142 such that there is reachability to the MS 123, may send to the MS 123, using the layer-3 connection 142, a configuration request for the MS 123 to provide the configuration information which the access router 112 may use to configure itself to operate using the full router configuration). In at least some embodiments, the full configuration of the access router 112 may be initiated by the MS 123 (e.g., the MS 123 may periodically poll to identify the availability of the access router 112 and send the full router configuration to the access router 112 after identifying the availability of the access router 112, the MS 123 may send the full router configuration to the access router 112 responsive to a notification that the access router 112 is available, or the like). In such embodiments, the access router 112 ultimately receives a full router configuration (e.g., in the form of a file or set of files or other form(s) of such configuration information) and configures itself, based on the full router configuration, to operate as a full router capable of supporting communications of devices associated with access site 110 (e.g., access device 111). The access router 112 may configure itself to operate as a full router by installing the configuration information received from the MS 123 (e.g., a file or set of files or other form(s) of such configuration information) into the boot and rebooting itself such that the full router configuration is applied (and, once the access router 112 reboots, it may operate as a full router). The access router 112 may then operate as a full router capable of supporting communications of devices associated with access site 110 (e.g., the access device 111).

The communication system 100 may be configured to support various other functions, such as various other functions for supporting automated discovery by the access router 112 of the layer-2 circuit identifier for the layer-2 circuit 141 that is provisioned by the communication network provider for the layer-2 interface of the access router 112, various functions for supporting automated configuration of the access router 112 by the MS 123 following establishment of the layer-3 connection 142 between the access router 112 and the core router 121 via the layer-2 circuit 141, or the like, as well as various combinations thereof.

Figure 2:
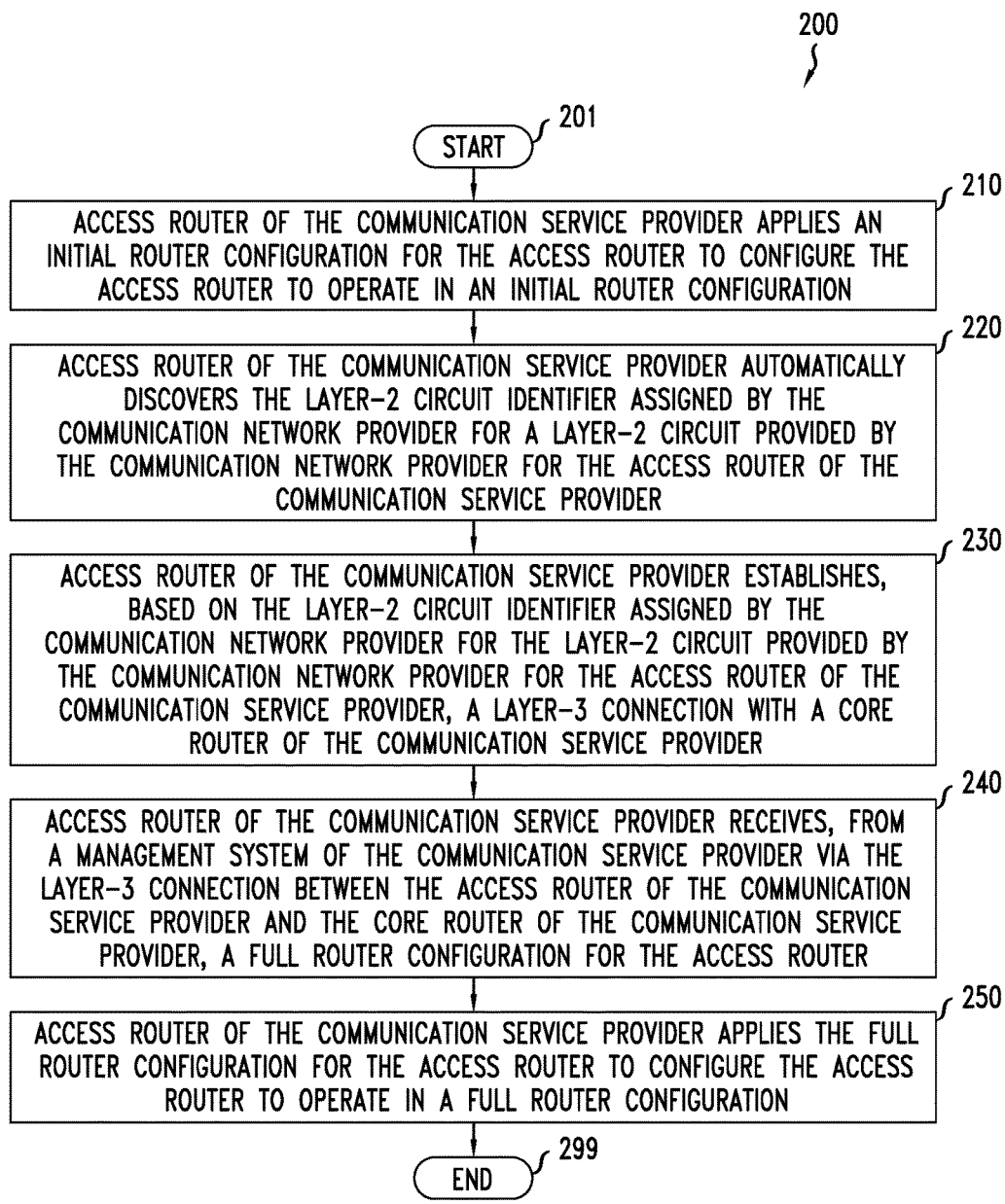
FIG. 2 depicts an embodiment of a method for use by an access router of a communication service provider to support automated configuration of the access router where the access router communicates using a layer-2 circuit provided by a communication network provider for the access router of the communication service provider.

FIG. 2 depicts an embodiment of a method for use by an access router of a communication service provider to support automated configuration of the access router where the access router communicates using a layer-2 circuit provided by a communication network provider for the access router of the communication service provider. It will be appreciated that, although primarily presented in FIG. 2 as being performed serially, at least a portion of the functions of method 200 of FIG. 2 may be performed contemporaneously or in a different order than as presented in FIG. 2.

At block 201, method 200 begins.

At block 210, the access router of the communication service provider applies an initial router configuration for the access router to configure the access router to operate in an initial router configuration. The application of the initial router configuration for the access router may be performed responsive to activation of the access router (e.g., when the access router first boots up). The initial router configuration of the access router enables the access router to perform functions which enable the access router to be automatically configured by a management system (including automated discovery of a layer-2 circuit identifier for a layer-2 circuit provided by the communication network provider for the access router).

At block 220, the access router of the communication service provider automatically discovers the layer-2 circuit identifier assigned by the communication network provider for the layer-2 circuit provided by the communication network provider for the access router of the communication service provider. An example method for use by the access router of the communication service provider to automatically discover the layer-2 circuit identifier assigned by the communication network provider for the layer-2 circuit provided by the communication network provider for the access router of the communication service provider is presented with respect to FIG. 3.

At block 230, the access router of the communication service provider establishes, based on the layer-2 circuit identifier assigned by the communication network provider for the layer-2 circuit provided by the communication network provider for the access router of the communication service provider, a layer-3 connection with a core router of the communication service provider. The access router may obtain the layer-3 address for the layer-3 connection within block 220 (e.g., during the automatic discovery of the layer-2 circuit identifier by the access router, such as where requests for layer-3 addresses are used for scanning potential layer-2 identifiers) or within block 230 (e.g., following the automatic discovery of the layer-2 circuit identifier by the access router, such as where monitoring a protocol for protocol advertisements is used for scanning potential layer-2 identifiers).

At block 240, the access router of the communication service provider receives, from a management system of the communication service provider via the layer-3 connection between the access router of the communication service provider and the core router of the communication service provider, a full router configuration for the router.

At block 250, the access router of the communication service provider applies the full router configuration for the access router to configure the access router to operate in a full router configuration. The full router configuration of the access router enables the access router to support communications of access devices associated with the access router.

At block 299, method 200 ends.

Figure 3:
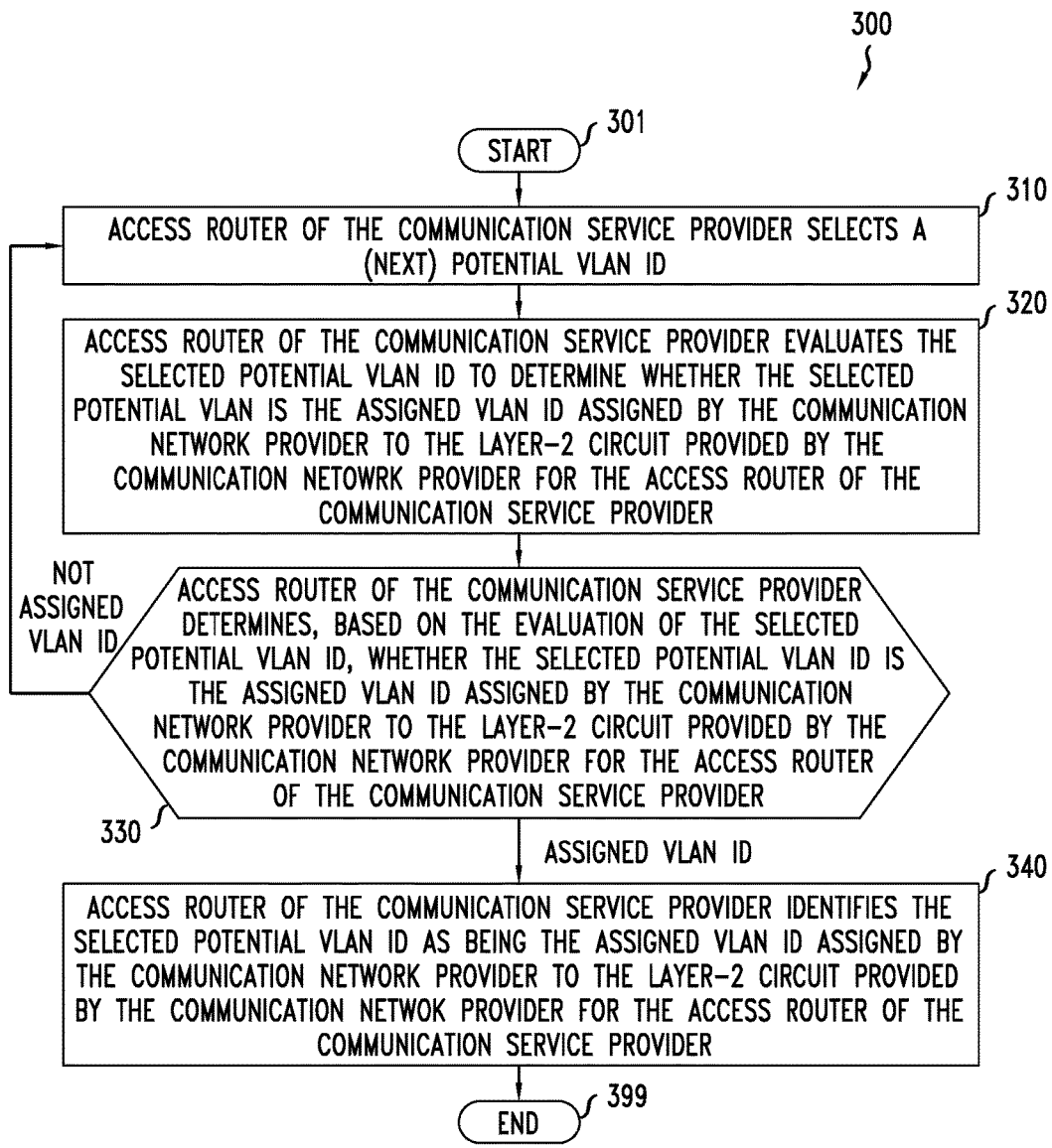
FIG. 3 depicts an embodiment of a method for use by an access router of a communication service provider to support automated discovery of a layer-2 circuit identifier of a layer-2 circuit provided by a communication network provider for the access router of the communication service provider.

FIG. 3 depicts an embodiment of a method for use by an access router of a communication service provider to support automated discovery of a layer-2 circuit identifier of a layer-2 circuit provided by a communication network provider for the access router of the communication service provider. For purposes of clarity, method 300 is primarily presented within the context of embodiments in which the layer-2 circuit identifier is a VLAN ID. It will be appreciated that, although primarily presented in FIG. 3 as being performed serially, at least a portion of the functions of method 300 of FIG. 3 may be performed contemporaneously or in a different order than as presented in FIG. 3.

At block 301, method 300 begins.

At block 310, the access router of the communication service provider selects a (next) potential VLAN ID. In a first pass through block 310 of the method 300, a first potential VLAN ID is selected from the set of potential VLAN IDs. In each subsequent pass through block 310 of the method 300, a different potential VLAN ID is selected from the set of potential VLAN IDs.

At block 320, the access router of the communication service provider evaluates the selected potential VLAN ID to determine whether the selected potential VLAN ID is the assigned VLAN ID assigned by the communication network provider to the layer-2 circuit provided by the communication network provider for the access router of the communication service provider.

At block 330, the access router of the communication service provider determines, based on the evaluation of the selected potential VLAN ID, whether the selected potential VLAN ID is the assigned VLAN ID assigned by the communication network provider to the layer-2 circuit provided by the communication network provider for the access router of the communication service provider. The evaluation of the selected potential VLAN ID may include monitoring a protocol for a protocol advertisement, initiating a request for a layer-3 address, or the like, as well as various combinations thereof. The method 300, based on a determination that the selected potential VLAN ID is not the assigned VLAN ID, returns to block 310 (at which point a next potential VLAN ID is selected for evaluation). The method 300, based on a determination that the selected potential VLAN ID is the assigned VLAN ID, proceeds to block 340.

At block 340, the access router of the communication service provider identifies the selected potential VLAN ID as being the assigned VLAN ID assigned by the communication network provider to the layer-2 circuit provided by the communication network provider for the access router of the communication service provider. The access router may initiate or perform other actions at this point, such as obtaining a layer-3 address (e.g., if the layer-3 address was not obtained by the access router in conjunction with identification of the assigned layer-2 circuit identifier), establishment of a layer-3 connection with a core router of the communication service provider, or the like, as well as various combinations thereof).

At block 399, method 300 ends.

It will be appreciated that, for purposes of clarity, method 300 is presented based on an assumption that one of the potential VLAN IDs is the assigned VLAN ID assigned by the communication network provider to the layer-2 circuit provided by the communication network provider for the access router of the communication service provider and, thus, that the assigned VLAN ID assigned by the communication network provider to the layer-2 circuit provided by the communication network provider for the access router of the communication service provider will be identified during execution of method 300 of FIG. 3. It will be appreciated that method 300 may be modified to handle the situation in which all of the potential VLAN IDs have been evaluated and the assigned VLAN ID assigned by the communication network provider to the layer-2 circuit provided by the communication network provider for the access router of the communication service provider is not successfully identified. For example, method 300 may be modified such that the access router determines whether all of the potential VLAN IDs have been evaluated and, based on a determination that all of the potential VLAN IDs have been evaluated and the assigned VLAN ID is not successfully identified, initiates or performs one or more actions (e.g., starting a timer and then reattempting to identify the assigned VLAN ID by reevaluating the set of potential VLAN IDs, triggering an alert to one or more network management technicians for further analysis of the situation, or the like, as well as various combinations thereof).

Figure 4:
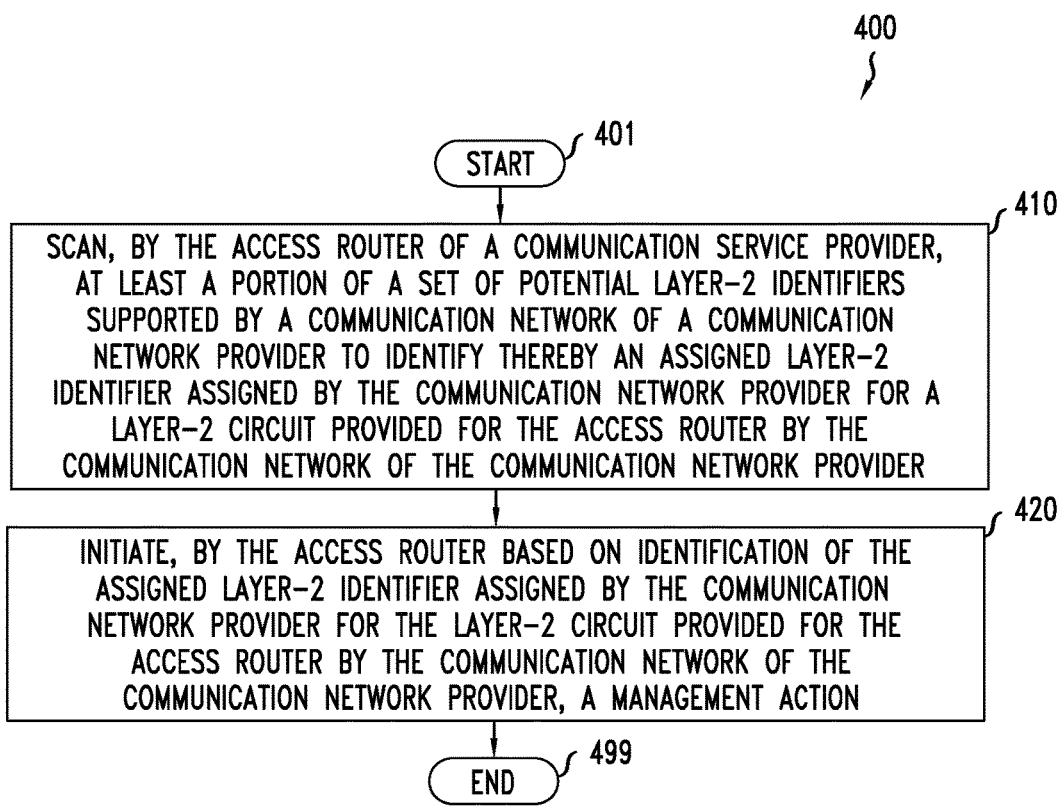
FIG. 4 depicts an embodiment of a method for use by an access router of a communication service provider to support automated discovery of a layer-2 circuit identifier of a layer-2 circuit provided for the access router by a communication network of a communication network provider.

FIG. 4 depicts an embodiment of a method for use by an access router of a communication service provider to support automated discovery of a layer-2 circuit identifier of a layer-2 circuit provided for the access router by a communication network of a communication network provider. It will be appreciated that, although primarily presented in FIG. 4 as being performed serially, at least a portion of the functions of method 400 of FIG. 4 may be performed contemporaneously or in a different order than as presented in FIG. 4.

At block 401, method 400 begins.

At block 410, the access router of the communication service provider scans at least a portion of a set of potential layer-2 identifiers, supported by a communication network of a communication network provider, to identify thereby an assigned layer-2 identifier assigned by the communication network provider for the layer-2 circuit provided for the access router by the communication network of the communication network provider.

At block 420, the access router initiates, based on identification of the assigned layer-2 identifier assigned by the communication network provider for the layer-2 circuit provided for the access router by the communication network of the communication network provider, a management action. The initiation of the management action may also include initiation or performance of various management actions, be followed by initiation or performance of various management actions, or the like, as well as various combinations thereof.

At block 499, method 400 ends.

It will be appreciated that, for purposes of clarity, method 400 is presented based on an assumption that one of the potential VLAN IDs is the assigned VLAN ID assigned by the communication network provider to the layer-2 circuit provided by the communication network provider for the access router of the communication service provider and, thus, that the assigned VLAN ID assigned by the communication network provider to the layer-2 circuit provided by the communication network provider for the access router of the communication service provider will be identified during execution of method 400 of FIG. 4. It will be appreciated that method 400 may be modified to handle the situation in which all of the potential VLAN IDs have been evaluated and the assigned VLAN ID assigned by the communication network provider to the layer-2 circuit provided by the communication network provider for the access router of the communication service provider is not successfully identified.

It will be appreciated that, although primarily presented herein within the context of embodiments of the automated service delivery capability in which the network access device is a particular type of network access device (namely, a particular type of router referred to herein as an access router), embodiments of the automated service delivery capability may be used for various other types of network access devices (e.g., switches, wireless access points, or the like) and, thus, references herein to the access router (or router) may be read more generally as being references to a network access device.

It will be appreciated that, although primarily presented herein within the context of embodiments of the automated service delivery capability in which the entities involved are a communication service provider and a communication network provider, embodiments of the automated service delivery capability may be used for various other environments or scenarios in which either or both of the entities involved are different (e.g., cloud providers, service providers, network providers, or the like) and, thus, references herein to the communication service provider and the communication network provider may be read more generally as being references to a first provider (or first entity) and a second provider (or second entity), respectively.

Various embodiments of the automated service delivery capability may be configured to provide various advantages or various potential advantages. For example, various embodiments may reduce the time required to configure an access router of a communication service provider where the access router communicates over a layer-2 circuit provided by a communication network provider, may reduce the cost required to configure an access router of a communication service provider where the access router communicates over a layer-2 circuit provided by a communication network provider, or the like, as well as various combinations thereof. Various embodiments of the automated service delivery capability may be configured to provide various other advantages or potential advantages.

Figure 5:
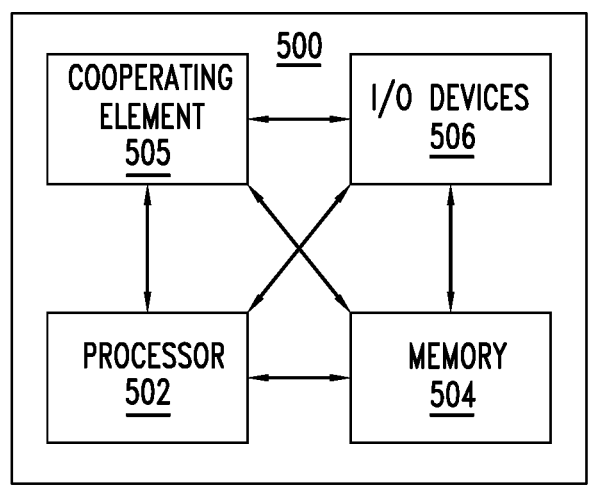
FIG. 5 depicts a high-level block diagram of a computer suitable for use in performing various functions presented herein.

FIG. 5 depicts a high-level block diagram of a computer suitable for use in performing various functions described herein.

The computer 500 includes a processor 502 (e.g., a central processing unit (CPU), a processor having a set of processor cores, a processor core of a processor, or the like) and a memory 504 (e.g., a random access memory (RAM), a read only memory (ROM), or the like). The processor 502 and the memory 504 are communicatively connected.

The computer 500 also may include a cooperating element 505. The cooperating element 505 may be a hardware device. The cooperating element 505 may be a process or set of instructions that can be loaded into the memory 504 and executed by the processor 502 to implement functions as discussed herein (in which case, for example, the cooperating element 505 (including associated data structures) can be stored on a non-transitory computer-readable storage medium, such as a storage device or other storage element (e.g., a magnetic drive, an optical drive, or the like)).

The computer 500 also may include one or more input/output devices 506. The input/output devices 506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 500 of FIG. 5 may represent a general architecture and functionality suitable for implementing functional elements described herein, portions of functional elements described herein, or the like, as well as various combinations thereof. For example, computer 500 may provide a general architecture and functionality that is suitable for implementing an element of the access site 110, the access device 111, the access router 112, an element of the core site 120, the core router 121, the MS 123, an element of third-party communication network 130, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable storage media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   a processor and a memory communicatively connected to the processor, the processor configured to:
   scan, by a network access device of a first entity, at least a portion of a set of potential layer-2 identifiers supported by a communication network of a second entity to identify thereby an assigned layer-2 identifier assigned by the second entity for a layer-2 circuit provided for the network access device by the communication network of the second entity;
   send, from the network access device toward a management system of the first entity based on identification of the assigned layer-2 identifier assigned by the second entity for the layer-2 circuit provided for the network access device by the communication network of the second entity and based on a layer-3 address for the network access device, request for a device configuration for the network access device; and
   receive, by the network access device from the management system, the device configuration for the network access device.

2. The apparatus of claim 1, wherein, to scan at least a portion of the set of potential layer-2 identifiers, the processor is configured to:
   select, from the set of potential layer-2 identifiers, a selected layer-2 identifier for evaluation to determine whether the selected layer-2 identifier is the assigned layer-2 identifier; and
   determine whether the selected layer-2 identifier is the assigned layer-2 identifier based on a determination as to whether the selected layer-2 identifier is assigned to the layer-2 circuit.

3. The apparatus of claim 2, wherein, to determine whether the layer-2 identifier is assigned to the layer-2 circuit, the processor is configured to:
   configure a layer-2 interface of the network access device to use the selected layer-2 identifier; and
   determine, based on configuration of the layer-2 interface of the network access device to use the selected layer-2 identifier, whether the selected layer-2 identifier is the assigned layer-2 identifier.

4. The apparatus of claim 2, wherein, to determine whether the layer-2 identifier is assigned to the layer-2 circuit, the processor is configured to:
   determine, based on monitoring of a protocol, whether a protocol advertisement of the protocol is received from a server.

5. The apparatus of claim 4, wherein the processor is configured to:
   identify the selected layer-2 identifier as being the assigned layer-2 identifier for the layer-2 circuit based on a determination that a protocol advertisement of the protocol is received from the server.

6. The apparatus of claim 4, wherein the protocol comprises a Dynamic Host Configuration Protocol (DHCP) and the protocol advertisement comprises a DHCP advertisement.

7. The apparatus of claim 2, wherein, to determine whether the layer-2 identifier is assigned to the layer-2 circuit, the processor is configured to:
   send, from the network access device toward a server, a request for the layer-3 address for the network access device; and
   determine whether the network access device receives, from the server, a response to the request for the layer-3 address for the network access device.

8. The apparatus of claim 7, wherein the processor is configured to:
   identify the selected layer-2 identifier as being the assigned layer-2 identifier for the layer-2 circuit based on a determination that the network access device receives, from the server, the response to the request for the layer-3 address for the network access device.

9. The apparatus of claim 7, wherein the request for the layer-3 address for the network access device and the response to the request for the layer-3 address for the network access device are based on a Dynamic Host Configuration Protocol (DHCP).

10. The apparatus of claim 1, wherein, to obtain the layer-3 address for the network access device, the processor is configured to:
    send, from the network access device toward a server based on the layer-2 circuit, a request for the layer-3 address for the network access device; and
    receive, by the network access device from the server based on the layer-2 circuit, the layer-3 address for the network access device.

11. The apparatus of claim 1, wherein the processor is configured to:
    apply, by the network access device, the device configuration for the network access device.

12. The apparatus of claim 1, wherein the layer-3 address comprises an Internet Protocol (IP) address.

13. The apparatus of claim 1, wherein the processor is configured to:
    apply an initial device configuration for the network access device responsive to activation of the network access device.

14. The apparatus of claim 1, where the layer-2 circuit comprises an Ethernet virtual circuit, wherein the assigned layer-2 identifier comprises a Virtual Local Area Network (VLAN) Identifier (ID).

15. The apparatus of claim 1, wherein the first entity is a communication service provider and the second entity is a communication network provider.

16. An apparatus, comprising:
    a processor and a memory communicatively connected to the processor, the processor configured to:
      scan, by a network access device of a first entity, at least a portion of a set of potential layer-2 identifiers supported by a communication network of a second entity to identify thereby an assigned layer-2 identifier assigned by the second entity for a layer-2 circuit provided for the network access device by the communication network of the second entity, wherein, to scan at least a portion of the set of potential layer-2 identifiers, the processor is configured to:
        select, from the set of potential layer-2 identifiers, a selected layer-2 identifier for evaluation to determine whether the selected layer-2 identifier is the assigned layer-2 identifier; and
        determine whether the selected layer-2 identifier is the assigned layer-2 identifier based on a determination, based on monitoring of a protocol to determine whether a protocol advertisement of the protocol is received from a server, as to whether the selected layer-2 identifier is assigned to the layer-2 circuit;
      send, by the network access device toward the server based on identification of the assigned layer-2 identifier assigned by the second entity for the layer-2 circuit provided for the network access device by the communication network of the second entity and based on the layer-2 circuit, a request for a layer-3 address for the network access device;
      receive, by the network access device from the server based on the layer-2 circuit, the layer-3 address for the network access device;
      send, from the network access device toward a management system of the first entity based on the layer-3 address for the network access device, a request for a full device configuration for the network access device;
      receive, by the network access device from the management system, the full device configuration for the network access device; and
      apply, by the network access device, the full device configuration for the network access device.

17. An apparatus, comprising:
    a processor and a memory communicatively connected to the processor, the processor configured to:
      scan, by a network access device of a first entity, at least a portion of a set of potential layer-2 identifiers supported by a communication network of a second entity to identify thereby an assigned layer-2 identifier assigned by the second entity for a layer-2 circuit provided for the network access device by the communication network of the second entity, wherein, to scan at least a portion of the set of potential layer-2 identifiers, the processor is configured to:
  select, from the set of potential layer-2 identifiers, a selected layer-2 identifier for evaluation to determine whether the selected layer-2 identifier is the assigned layer-2 identifier; and
  determine whether the selected layer-2 identifier is the assigned layer-2 identifier based on a determination as to whether the selected layer-2 identifier is assigned to the layer-2 circuit, wherein, to determine whether the layer-2 identifier is assigned to the layer-2 circuit, the processor is configured to:
    send, from the network access device toward a server, a request for a layer-3 address for the network access device; and
    determine whether the network access device receives, from the server, a response to the request for the layer-3 address for the network access device;
  send, from the network access device toward a management system of the first entity based on identification of the assigned layer-2 identifier assigned by the second entity for the layer-2 circuit provided for the network access device by the communication network of the second entity and based on the layer-3 address for the network access device, a request for a full device configuration for the network access device;
  receive, by the network access device from the management system, the full device configuration for the network access device; and
  apply, by the network access device, the full device configuration for the network access device.

18. A method, comprising:
scanning, by a network access device of a first entity, at least a portion of a set of potential layer-2 identifiers supported by a communication network of a second entity to identify thereby an assigned layer-2 identifier assigned by the second entity for a layer-2 circuit provided for the network access device by the communication network of the second entity;
sending, from the network access device toward a management system of the first entity based on identification of the assigned layer-2 identifier assigned by the second entity for the layer-2 circuit provided for the network access device by the communication network of the second entity and based on a layer-3 address for the network access device, a request for a device configuration for the network access device; and
receiving, by the network access device from the management system, the device configuration for the network access device.

19. An apparatus, comprising:
a processor and a memory communicatively connected to the processor, the processor configured to:
  apply, by a network access device of a first entity, an initial configuration for the network access device;
  discover, by the network access device based on the initial configuration for the network access device, an assigned layer-2 identifier of a layer-2 circuit provided for the network access device by a communication network of a second entity;
  establish, based on the assigned layer-2 identifier of the layer-2 circuit, a layer-3 connection between the network access device and a second device of the first entity;
  receive, by the network access device from a management system of the first entity via the layer-3 connection between the network access device and the second device, a device configuration for the network access device; and
  apply, by the network access device, the device configuration for the network access device.

20. A method, comprising:
applying, by a network access device of a first entity, an initial configuration for the network access device;
discovering, by the network access device based on the initial configuration for the network access device, an assigned layer-2 identifier of a layer-2 circuit provided for the network access device by a communication network of a second entity;
establishing, based on the assigned layer-2 identifier of the layer-2 circuit, a layer-3 connection between the network access device and a second device of the first entity;
receiving, by the network access device from a management system of the first entity via the layer-3 connection between the network access device and the second device, a device configuration for the network access device; and
applying, by the network access device, the device configuration for the network access device.

* * * * *